Patented Nov. 26, 1935

2,022,307

UNITED STATES PATENT OFFICE 2,022,307

WELDING ROD

John B. Austin, Cleveland, Ohio, assignor to Una Welding, Inc., East Cleveland, Ohio, a corporation of Delaware No Drawing. Application August 12, 1925, Serial No. 49,834. Renewed February 16, 1931

9 Claims. (Cl. 219—8)

This invention relates to the art of welding, and particularly to ferrous welding rods or electrodes for use in such art.

In ferrous welding practice, such as electric arc welding, it has long been customary to employ low carbon steel welding rods or electrodes. As equivalent to and synonymous with low carbon steel may for the present purpose be considered all low carbon ferrous material such as Armco iron, or wrought iron. It is desirable that the weld metal produced from such welding rods be of high quality to withstand the stresses received by such welds in service. In seam welded rail joints, where low or medium carbon steel fish plates are welded to high carbon steel rails the weld metal employed must be of very high quality to withstand the severe shrinkage and other stresses such as expansion and contraction received in service. It may be noted that in welding rail joints, the rails and fish plates are rigidly positioned and may practically never relieve any of the shrinkage or welding stresses as by change of position. It is thus evident that the weld metal must be ductile enough to absorb all such welding stresses. It will thus be seen that a welding rod which may be entirely satisfactory and give welds of high tensile strength when used to join articles which are free to move and thus to substantially relieve the shrinkage and welding stresses might not be satisfactory for use in welding rigidly positioned members, as in the case of rail joints. It is thus particularly important that the weld metal in rail joints be ductile and resistant to repeated impact stresses as well as homogeneous, non-porous and uniform in quality. This observation has been substantiated by many tests in the laboratory and field. It has frequently been found, however, that weld metal produced in rail joints from ordinary low carbon steel welding rods has been of inferior quality, being in many cases, brittle, porous, coarse-grained, and containing considerable amounts of non-metallic impurities, such as oxides and nitrides. Such low carbon steel rods have also frequently been of low weldability, by which is meant that it has in many cases been difficult to cause the metal from such welding rod to unite integrally to the metal or metals being welded, particularly when there has been present a layer of oxide or similar material on the surface of the ferrous material to be welded.

It will be understood that in this specification and claims I intend the terms electrode and welding rod as being synonymous in their meaning.

One object of my invention is to provide a welding rod or electrode from which weld metal of greatly improved physical properties may be produced.

A further object of the invention is to provide a welding rod or electrode which in the molten state may be readily joined to other metal to form a non-porous, strong, integral union.

Another object of this invention is to provide a welding rod or electrode having improved flowing properties and weldability.

Another object of my invention is to provide a welding rod particularly adapted for use in integrally uniting fish plates to rails in forming welded rail joints.

A further object of this invention is to provide a welding rod for use in welded rail joints, said rod forming weld metal of very high quality, particularly with reference to ductility and resistance to repeated impact and other forces.

Other objects of the invention will be apparent from the description of it hereinafter given.

I have found that weld metal of greatly improved properties including ductility and resistance to repeated impact, solidity, homogeneity, cleanliness, and freedom from inclusions, may be formed by associating with a welding rod such as of low carbon steel, deoxidizing, denitrogenizing, and scavenging agents, such as titanium and vanadium. Such agents may be associated with said welding rod or electrodes by alloying with said electrodes, coating thereon, or in any other suitable manner. Thus, titanium and vanadium might be alloyed with the steel in the manufacture thereof. The titanium and vanadium might also be associated with the steel in the form of ferro or other alloys coated on such electrodes. Or, either one of said titanium or vanadium might be present in the steel and alloyed therewith, and the other present in a coating on said electrode, in the form of the pure metal or a ferro or other alloy thereof.

I frequently find it desirable to associate with the welding rod, in addition to the metallic weld-purifying agents a diluent, such as certain clays and refractories by the use of which the flowing properties of the electrode and the welding results obtained therefrom appear to be of greatly improved character.

As is well known, metal melted in a welding operation, such as by the electric arc, is subjected, when in the molten condition, to the oxidizing atmosphere of the arc. Such deleterious oxidizing effect upon the molten steel may in part be counteracted by associating with said molten steel an active deoxidizer and denitrogenizer, such as for example, titanium in the pure or alloyed form. I have found as the result of considerable experimentation, however, that greatly improved weld metal may be obtained by employing deoxidizing and denitrogenizing agents comprising approximately two parts of vanadium and one part of titanium, whereby weld metal is obtained of increased solidity and finer grain structure. I have further found that improved flowing properties and in general better results have obtained by associating with said metallic deoxidizers refractory and clay material, such as for example, the material known in the trade as alundum, and clay. I have found it convenient to employ titanium and vanadium in the form of carbon-free ferro-alloys, though other forms of the metals may be employed to equal advantage. Preferably the deoxidizers and refractory and clay materials, which may for convenience be termed weld-modifying ingredients, are of fine mesh, thus preferably of 200 mesh or finer. I have found it convenient to associate the weld-modifying ingredients with the welding rod by coating them thereon by means of a suitable binder, such as shellac. Thus a suspension of the weld-modifying ingredients may be made in shellac and said suspension applied to the welding rod by dipping the rod in said suspension or by painting said suspension on the rod by means of a brush, or by other means. I have found the most satisfactory welding results to be obtained when sufficient suspension be applied to the rod so that with respect to the weight of the rod itself, the weld-modifying ingredients are present in approximately the following proportions:

| | Per cent |
|---|---|
| Titanium | 0.06 |
| Vanadium | 0.14 |
| Alundum and clay | 0.30 |

Excellent results may still be obtained by varying somewhat from the above proportions but it is preferable that the titanium never be over .20% in amount, that the vanadium never be present in amount over 0.25%, and that the sum of the titanium and vanadium never be over 0.29%. In certain cases the alundum and clay may be omitted, as for example, where the titanium and vanadium are associated with the welding rod during the manufacture thereof.

While good welding results may be obtained by associating weld-modifying ingredients of the above-described nature with any low carbon steel rod of high quality, I prefer to employ in connection with the above weld-modifying ingredients a steel rod of approximately the following composition:

| | Maximum per cent |
|---|---|
| Carbon | 0.10 |
| Manganese | 0.50 |
| Silicon | 0.20 |
| Phosphorus | 0.04 |
| Sulphur | 0.04 |

Preferably the carbon content of the steel does not exceed 0.2%.

I have carried out numerous tests demonstrating the superiority of welds made with my improved welding rod as compared with welds made with bare low carbon steel welding rod. Thus I have obtained flat test bars by machining metal pieces formed entirely of deposited arc-fused metal. Such test bars made from my improved welding rod showed slightly more than twice the ductility in bending as compared with test bars formed from bare low carbon steel welding rod.

The superiority in resistance to repeated impact of weld metal formed from my improved welding rod has also been demonstrated. Thus, small vertical steel plates were welded to horizontal plates with my improved welding rod and with bare low carbon welding rod. Equal masses of welding rod were used in both cases. The vertical plates were then struck by a pivotally mounted hammer, the length of the hammer travel being eighteen inches. Over twice as many blows were required to fracture the weld made from my improved welding rod as was required to break the weld made with the usual low carbon steel welding rod.

It has furthermore been demonstrated by actual tests in a repeated impact testing machine that rail joints welded with my improved rod have been much more resistant to repeated impact stresses than joints welded similarly but with an ordinary bare low carbon steel rod. It will thus be seen that the use of my improved welding rod gives distinct advantages when used to integrally unite fish plates to rails in forming welded rail joints.

The advantages of my improved welding rod are very obvious when welding steel having an appreciable amount of rust or oxide thereon. The weld-modifying ingredients associated with my welding rod dissolve, reduce, or remove such surface contaminants, thereby providing greater ease of welding to such oxide-coated surfaces, and thereby greatly increasing the weldability of the welding rod. The presence of the weld-modifying ingredients not only reduces or eliminates oxides and other deleterious material interfering with the obtaining of integral union of the weld metal to metallic surfaces, but further cleanses and scavenges the weld metal itself, purging said weld metal of deleterious impurities, such as oxides and nitrides, thus rendering the weld metal solid, homogeneous and metallurgically clean in structure.

It will be seen that I have provided a welding rod having greatly improved flowing properties.

It will further be seen that weld metal produced from welding rod having associated therewith the weld-modifying ingredients described hereinabove is greatly superior in quality with respect to solidity, mechanical homogeneity, and freedom from metallic and non-metallic impurities.

It will also be seen that with my improved welding rod welds may be obtained of greatly superior mechanical quality, as for example, ductility and resistance to repeated impact.

It will further be noted that in welding fish plates to rails to form welded rail joints, the use of my improved welding rod provides weld metal of great solidity, non-porosity, ductility, and resistance to repeated impact, thereby greatly increasing the life of such rail joints in service.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. A low carbon steel welding rod having associated therewith about 0.06% titanium and about 0.14% vanadium.

2. A low carbon steel welding rod having associated therewith about 0.06% titanium, about 0.14% vanadium, and about 0.3% fluxing material.

3. A steel welding rod or electrode containing not over about 0.2% carbon, having coated thereon about 0.06% titanium, about 0.14% vanadium, and about 0.3% alundum and clay, said coating being attached to said welding rod or electrode by means of a suitable binder.

4. A low carbon steel welding rod having associated therewith titanium in effective amount appreciably greater than a trace but not exceeding about 0.2%, and vanadium in effective amount appreciably greater than a trace but not exceeding about 0.25%, the total amount of titanium and vanadium ranging from 0.16% to 0.29%.

5. A low carbon steel welding rod having a coating thereon comprising titanium in effective amount appreciably greater than a trace but not exceeding about 0.2%, and vanadium in effective amount appreciably greater than a trace but not exceeding about 0.25%, the total amount of titanium and vanadium ranging from 0.16% to 0.29%.

6. A low carbon steel welding rod having a coating thereon comprising titanium in effective amount appreciably greater than a trace but not exceeding about 0.2%, vanadium in effective amount appreciably greater than a trace but not exceeding about 0.25%, and fluxing material, the total amount of titanium and vanadium ranging from 0.16% to 0.29%.

7. A low carbon steel welding rod having a coating thereon comprising titanium in effective amount appreciably greater than a trace but not exceeding about 0.2%, vanadium in effective amount appreciably greater than a trace but not exceeding about 0.25%, the total amount of titanium and vanadium ranging from 0.16% to 0.29%, and refractory fluxing material in effective amount appreciably greater than a trace but not exceeding about 0.3% in amount.

8. A weld rod containing from .05 to .25% carbon, from .02 to .20% vanadium, and from .04 to .20% of a vanadium protecting agent which will preferentially combine with the gases present in the atmosphere and from the welding torch more readily than vanadium.

9. A weld rod containing from .05 to .25% carbon, from .02 to .20% vanadium, and from .04 to .20% titanium.

JOHN B. AUSTIN.